United States Patent [19]

Rozmus

[11] 4,298,168

[45] Nov. 3, 1981

[54] POWDER DISPENSING ASSEMBLY

[75] Inventor: Walter J. Rozmus, Traverse City, Mich.

[73] Assignee: Kelsey-Hayes Company, Romulus, Mich.

[21] Appl. No.: 139,907

[22] Filed: Apr. 14, 1980

[51] Int. Cl.³ .......... A01C 3/06

[52] U.S. Cl. .......... 239/659; 222/161; 222/199; 222/200; 209/135; 209/147

[58] Field of Search .......... 222/161, 164, 181, 185, 222/200, 196, 403, 409, 533, 199; 239/659; 209/639, 134, 135, 142, 149

[56] References Cited

U.S. PATENT DOCUMENTS

| | | | |
|---|---|---|---|
| 2,311,373 | 2/1943 | Durning | 222/161 X |
| 2,619,090 | 11/1952 | Clausen | 222/200 X |
| 3,115,278 | 12/1963 | Mylting | 222/56 |
| 3,173,583 | 3/1965 | Wahl | 222/199 |
| 3,297,203 | 1/1967 | Wahl | 222/196 X |
| 3,659,753 | 5/1972 | Jäger | 222/199 |
| 3,814,386 | 6/1974 | Guglietti | 259/2 |

*Primary Examiner*—Allen N. Knowles
*Attorney, Agent, or Firm*—McGlynn and Milton

[57] ABSTRACT

A powder dispensing assembly including an elongated chute having opposite ends pivotally supported for rotation about a pivot axis within an elongated housing and having a funnel-shaped cross section with a wide upper portion and a narrow lower portion. A dispensing platform is integral with the rear wall of the chute and extends forwardly beneath the front wall and slopes upwardly to a lip over which particles of powder move to define a falling curtain of powder particles. A supply platform is supported just above the pivot axis and receives powder from an elongated slot and supplies powder to the dispensing platform as the powder falls downwardly through the chute. The supply platform is wider than the angle of repose of the powder supplied thereto so that when the supply platform is not moving powder is not being supplied to the lower dispensing platform. An electromagnet cooperates with a spring plate which is, in turn, connected by a rod through the housing to the rear wall of the chute. The electromagnet operates on 60 cycle AC and, when energized, sets up a magnetic field to bend the spring plate to rotate the chute in a counterclockwise direction about its pivot axis and between cycles the spring plate springs back and returns the chute by rotating it in the clockwise direction. The upper supply platform, therefore, rocks about the pivot axis to supply powder to the lower dispensing platform.

16 Claims, 4 Drawing Figures

POWDER DISPENSING ASSEMBLY

BACKGROUND OF THE INVENTION (1) Field of the Invention

The powder dispensing assembly of the subject invention is utilized to dispense a curtain of falling powder particles at a controlled and precise rate. Although not limited thereto, the subject invention was developed and is particularly suitable for use in the processing of powdered metal particles. In the processing of powdered metal particles the particles are frequently classified according to size. One manner in which this is accomplished is to establish a curtain of falling particles which fall into a horizontally moving stream of gas which establishes short trajectories for the heavier particles and long trajectories for the lighter particles so that the particles fall into classification compartments. The subject invention is particularly useful for dispensing such a curtain of falling powder particles.

(2) Description of the Prior Art

There are known in the prior art dispensing assemblies which dispense particles. Specifically, there are known in the prior art dispensing assemblies wherein a platform is supplied particles and vibrated to move the particles to an edge or lip over which they fall. The problem with prior art dispensing assemblies is that there are none available which very precisely dispense a controlled amount of particles in a controlled manner and which can precisely control the termination of particle dispensing, i.e., prevent spillage, or the like.

SUMMARY OF THE INVENTION

A powder dispensing assembly including a support structure with a dispensing platform supported by the support structure for receiving powder and having a distal lip over which particles of powder move to define a falling curtain of powder particles. A supply platform is supported by the support structure for receiving powder and supplying the powder to the dispensing platform. A flow control means establishes a flow path of the powder from the supply platform to the dispensing platform. The assembly is characterized by a drive means for vibrating the dispensing platform to move particles thereover and over the lip and for moving the supply platform in unison with the dispensing platform to move powder from the supply platform and through the flow control means to the dispensing platform. By utilizing a supply platform which is moved in unison with the vibration of the dispensing platform the assembly dispenses a precise and controlled amount of powder.

PRIOR ART STATEMENT

As alluded to above, there are known in the prior art dispensing devices which include a vibrating platform which vibrates to move powder to an edge or lip over which the powder falls. An example of one such device is shown in U.S. Pat. No. 3,115,278 granted Dec. 24, 1963 to Mylting. There is also known in the prior art systems which include a plurality of vibrating chutes which feed one another for mixing powder materials. An example of such an assembly is shown in U.S. Pat. No. 3,814,386 granted June 4, 1974 to Guglietti. The prior art, however, does not teach applicant's assembly wherein a supply platform is moved in unison with a vibrating dispensing platform to supply powder from the supply platform to the dispensing platform to provide the precise dispensing of powder particles.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
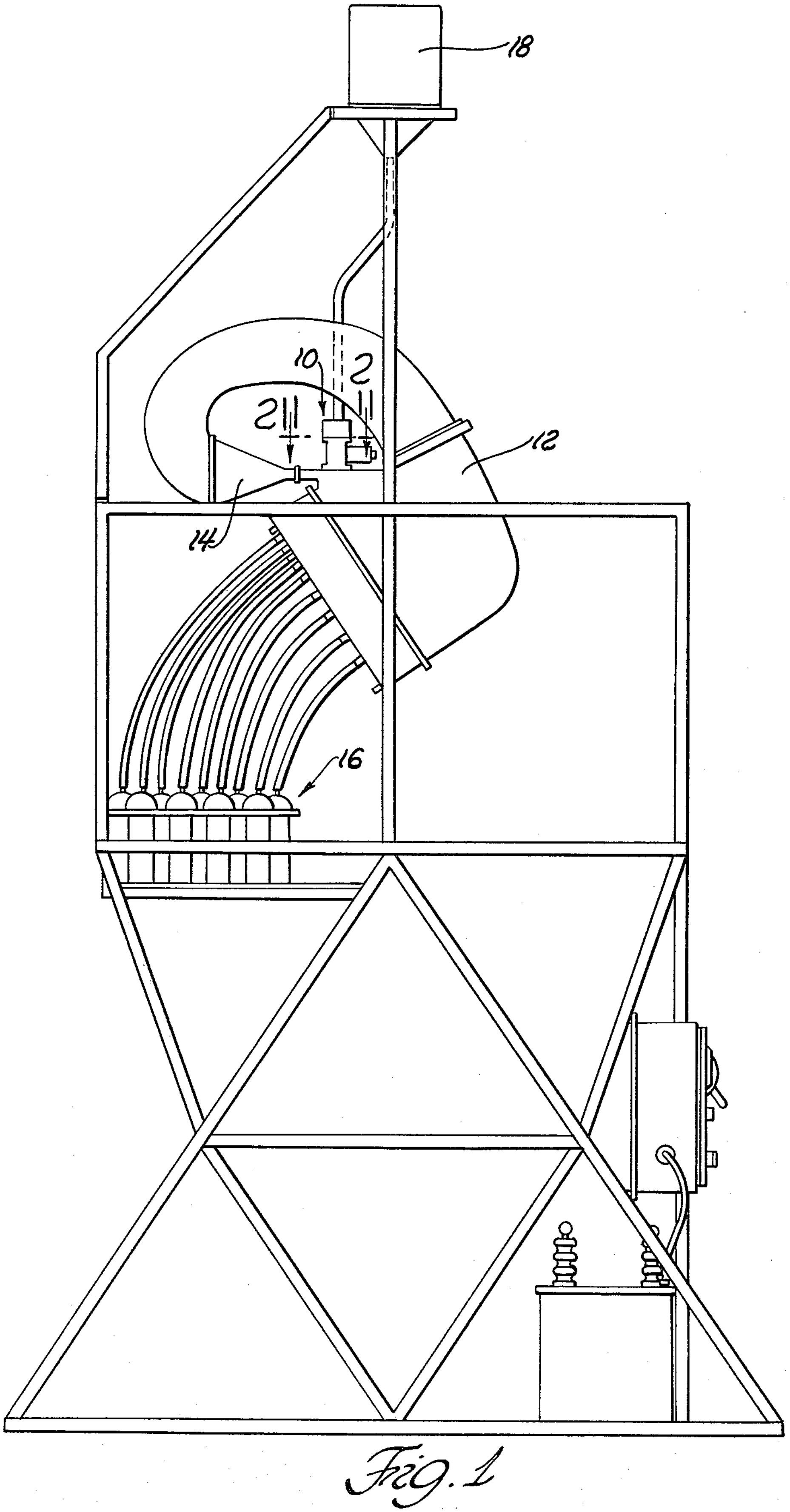
FIG. 1 is an elevational view of a powder classifying assembly with which the dispensing assembly of the subject invention may be utilized.
Figure 2:
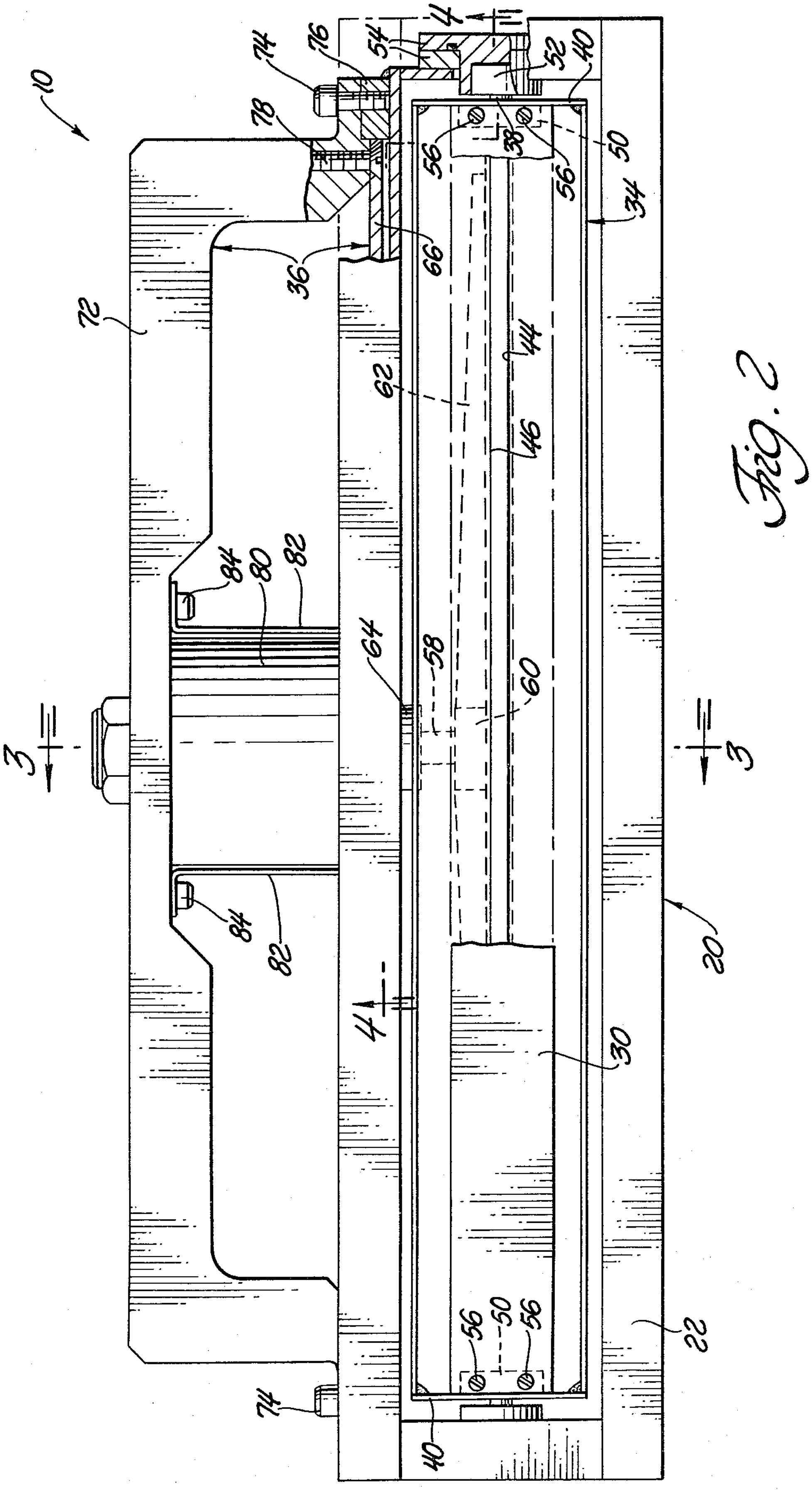
FIG. 2 is an enlarged view taken substantially along line 2—2 of FIG. 1 and partially broken away and in cross section to illustrate the dispensing assembly of the subject invention.

A powder dispensing assembly constructed in accordance with the subject invention is generally shown at 10. As alluded to above, the powder dispensing assembly 10 is particularly suited for dispensing a curtain of falling powder metal particles into a horizontal flow of gas for classifying the particles by size and weight. An example of such a powder classification assembly is shown in FIG. 1 which incorporates the powder dispensing assembly 10 of the subject invention. The classifying apparatus shown in FIG. 1 includes a ductwork 12 through which a gas is circulated so as to pass through a nozzle 14 and engage a falling curtain of powder particles which are dispensed from the dispensing assembly 10. The particles are classified by size and weight into the various containers generally shown at 16. Initially, the powder particles to be classified are supplied from the container 18 to a supply slot for supplying the dispensing assembly 10, as will be more clear hereinafter.

The powder dispensing assembly 10 includes a support structure defined by a rectangular housing 20. The housing generally shown at 20 has parallel side walls and parallel end walls with upper 22 and lower 24 flanges extending about the periphery thereof for attachment to adjacent components, as is illustrated in FIG. 1. The assembly 10 includes a dispensing platform 26 supported by the housing 20 for receiving powder and has a distal lip or edge 28 over which particles of powder move to define a falling curtain of powder particles falling from the lip or edge 28.

There is also included a supply platform 30 supported by the support structure for receiving powder and supplying the powder to the dispensing platform 26. The housing 20 is adapted by the flange 22 to receive an elongated supply slot 32 for supplying powder to the supply platform 30.

There is also included flow control means defined by the chute generally indicated at 34 for establishing a flow path of the powder from the supply platform 30 to the dispensing platform 26.

The assembly also includes drive means generally indicated at 36 for vibrating the dispensing platform 26 to move particles thereover and over the lip 28 thereof and for moving the supply platform in unison with the dispensing platform 26 to move powder from the supply platform 30 and through the chute 34 to the dispensing platform 26.

The supply platform 30 is supported for rocking movement about a pivot axis defined by the axis of the support pins 38. The dispensing platform 26 is supported for oscillation in an arc having its center on the pivot axis defined by the pins 38.

The chute 34 is elongated and has a funnel shape as viewed in cross section with opposite ends 40. The wide upper portion 42 which extends between the ends 40 has an upper extremity above the supply platform 30 with the sides thereof extending vertically downwardly and then tapered so as to converge toward one another to join the narrow lower portion having the parallel spaced front 44 and rear 46 walls. The lower portion defined by the front 44 and rear 46 walls define an opening 48. More specifically, the dispensing platform 26 is integral with the rear wall 46 and extends forwardly beneath the lower extremity of opening 48 defined by the front wall 44 to the distal end defining the lip or edge 28 which is spaced forwardly of the front wall 44. The dispensing platform 26 slopes upwardly from the bottom of the rear wall 46 to the lip 28 in relationship to the front and rear walls 46. In other words, as the front and rear walls 44 and 46 are vertical, the dispensing platform 26 is not horizontal but slopes upwardly from rear to front.

The ends 40 of the chute 34 are supported by the support structure defined by the housing 20 for oscillation about the pivot axis defined by the pins 38. Specifically, blocks 50 are welded or otherwise secured to the interior of the end walls 40 and the pins 38 extend therefrom through the end walls 40 to be supported in resilient plastic members 52. The resilient bushings or bearing support members 52 are, in turn, supported within the cap assemblies 54 which are welded or otherwise secured to the exterior surfaces of the end walls of the housing 20.

The upper surfaces of the blocks 50 are horizontal and the ends of the supply platform 30 are disposed thereon and secured thereto by the fasteners 56. Thus, the supply platform 30 is supported by the blocks 50 within the wide upper portion 42 of the chute 34 and between the ends 40 of the chute 34. The supply platform 30 has its side edges disposed vertically above the tapered converging walls of the wide upper portion 42 of the chute 34 and is disposed immediately above the pivot axis defined by the pins 38. The supply platform 30 is an elongated flat plate having a longitudinal center line which is substantially vertically aligned with the pivot axis of the pins 38 when in the neutral or horizontal position. The supply platform 30 is disposed above the dispensing platform 26 whereby powder particles fall from the supply platform 30 to engage the converging walls of the upper wide portion 42 to flow down between the front and rear walls 44 and 46 to the dispensing platform 26. The supply platform 30 is spaced closer to the pivot axis of the pivot pins 38 than the dispensing platform 26. Specifically, the supply platform 30 is spaced immediately above the pivot axis defined by the pins 38 and, in some instances, could be on the pivot axis of the pins 38. Thus, the housing 20, through the pins 38, supports the entire chute 34 and the platforms 30 and 26 for rotation about the pivot axis defined by the pins 38.

The supply slot 32 supplies powder to the platform 30 and the slot 32 has a width narrow enough that the angle of repose of the powder from the supply slot 32 is less than the width of the supply platform 30 so that powder remains upon the supply platform 30 when the supply platform 30 remains horizontal, i.e., does not rock about the axis of the pins 38.

The drive means 36 includes a rod or shaft 58 extending into and through the back wall of the housing 20 from the exterior thereof and is connected to the rear wall 46 of the chute 34 adjacent the lower extremity of the rear wall 46. More specifically, the shaft 58 is threaded into a member 60 which is, in turn, welded to the rear wall 46 and an inwardly tapered backing plate 62 extends laterally from the member 60 and is secured to the rear wall 46. The shaft 58 is in sealed engagement with the rear wall of the housing 20 by way of a bushing 64 which supports a seal and surrounds the shaft 58 on the interior of the rear wall of the housing 20.

The drive means 36 further includes a spring plate 66 which extends between opposite ends of the housing 20 on the exterior of the housing 20. The rod 58 has a threaded extension 68 which extends through a saddle portion 70 of the spring plate 66 and has a nut threaded thereon for connecting the spring plate 66 to the rod 58.

A U-shaped bracket 72 is attached by the bolts 74 to the exterior of the housing 20 and at the ends of the housing 20. Support blocks 76 are welded or otherwise secured to the rear wall of the housing 20 and threadedly receive the bolts 74 for supporting the U-shaped bracket 72. The ends of the spring plate 66 are secured to the outward ends of the legs of the U-shaped member 72 by the screws 78.

The drive means also includes an electromagnet 80 for moving the spring plate 66 to move the rod 58 to rotate the chute 34 about the pivot axis defined by the pins 38. The electromagnet 80 is secured to the U-shaped bracket 72 by the clips 82 and fasteners 84 which threadedly engage the bracket 72 to hold the clips 82 in position.

The electromagnet 80 includes a coil wound about a central core 86 having an end spaced from the spring plate 66, i.e., there is a gap between spring plate 66 and the end of the core 86. The gap or the distance the core 86 is from the spring plate 66 may be adjusted by the cap and screw assembly 88.

The housing 20 is made of an nonmagnetic material, such as a stainless steel, whereas the U-shaped bracket 72 and the spring plate 66 are made of magnetic material, i.e., a ferric material, the spring being preferably made of a low carbon steel.

The electromagnet 80 operates on 60 cycle AC so that it is cyclically operable to establish a magnetic field for moving the spring plate 66 to move the dispensing platform 26 rearwardly so that the spring plate 66 returns to its unsprung condition between the "on" cycles of the electromagnet 80. Specifically, when the electromagnet 80 is "on" it establishes a magnetic field with lines of flux flowing through the core 86, one side of the spring plate 66 and one side of the U-shaped bracket 72 with like magnetic flux lines passing through the opposite end of the spring plate 66 and the opposite end of the U-shaped bracket 72. This magnetic field pulls the spring plate 66 from its natural unsprung position toward the core 86. During the "off" cycle where there is no magnetic field established, the spring plate 66 returns to its unsprung position.

Figure 3:
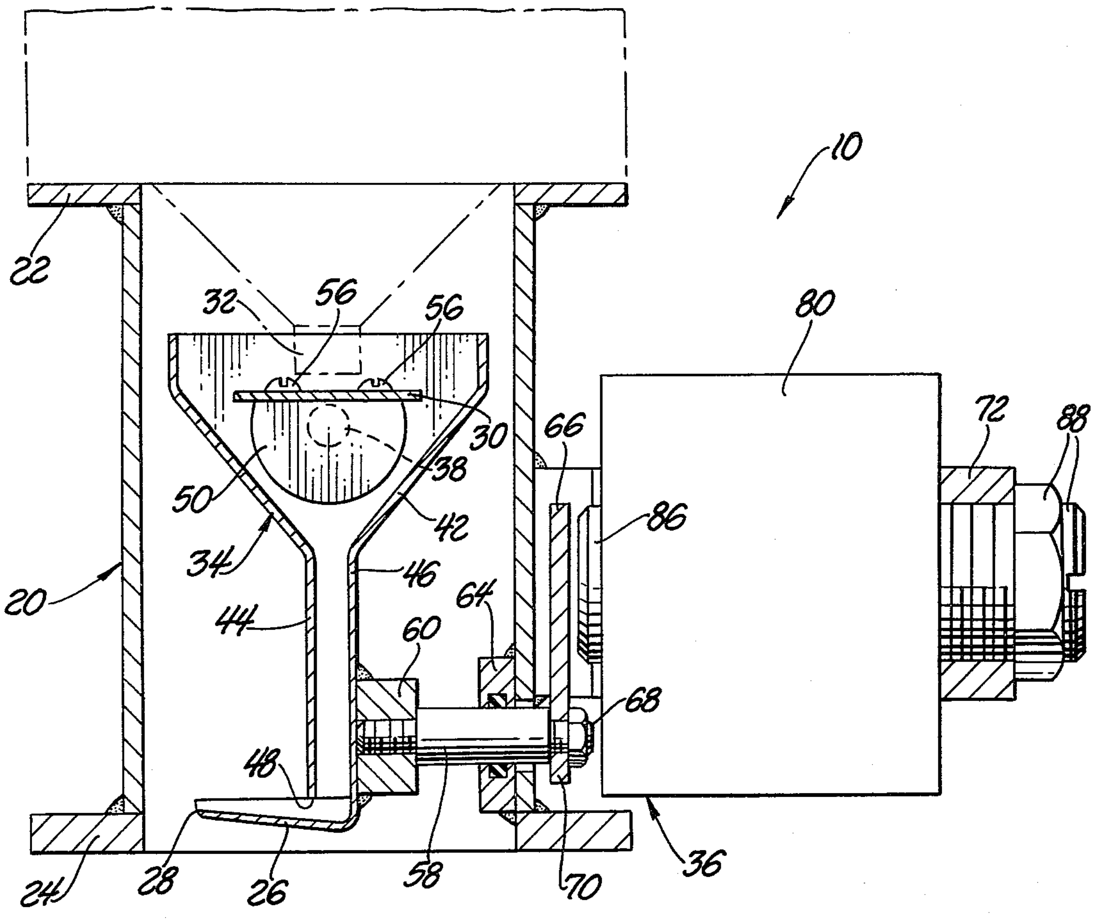
FIG. 3 is a cross-sectional view taken substantially along line 3—3 of FIG. 2.
Figure 4:
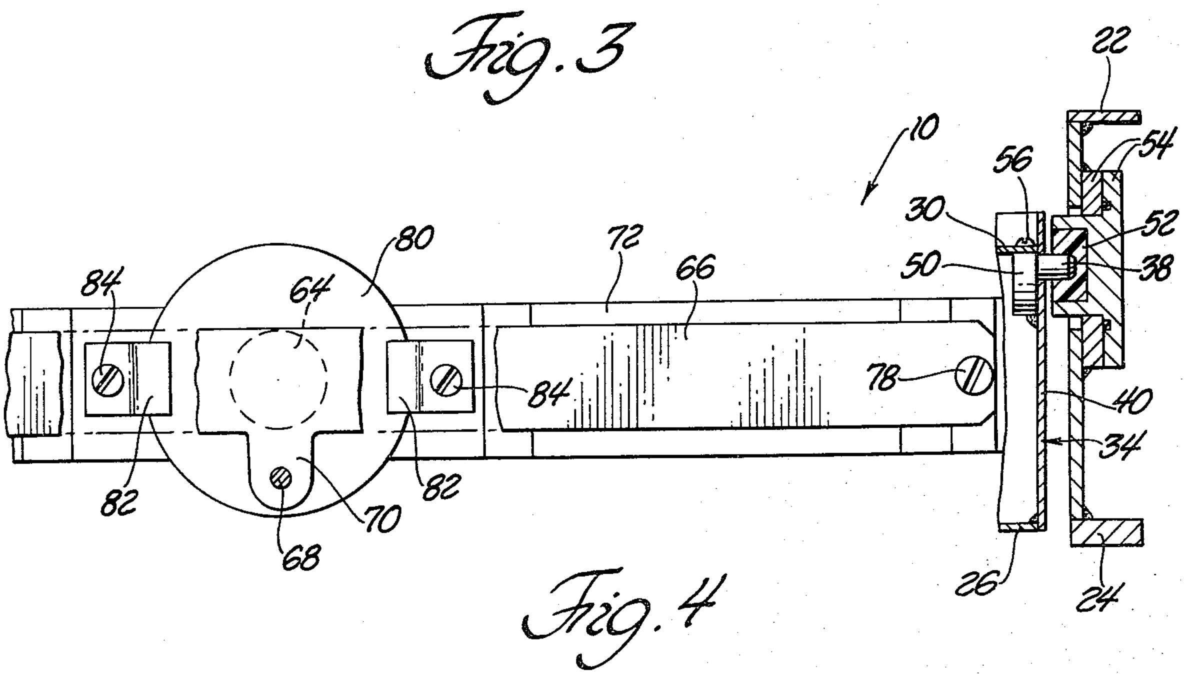
FIG. 4 is a cross-sectional view taken substantially along line 4—4 of FIG. 2.

When the assembly is not operating, it would remain in the position shown in FIG. 3 and, as pointed out above, the supply platform 30 is of a sufficient width so as to be greater than the angle of repose of the powder supplied from the supply slot 32. Thus, no powder would be supplied from the supply platform 30 to the dispensing platform 26 so that there would be no spillage. When operating, the electromagnet 80 springs the spring plate 66 60 cycles per second. During each "on" cycle the spring plate 66 is bowed rearwardly or toward the core 86 so as to move the shaft 58 and rotate the chute 34 in the counterclockwise direction. In so doing, the supply platform 30 is rocked about the pivot axis defined by the pins 38 so that a small amount of powder will flow off the supply of platform 30 and fall onto the dispensing platform 26. It is important to note that the dispensing platform 26 is a greater distance from the pivot axis defined by the pins 38 than is the supply platform 30 so that, as the platforms 26 and 30 move in unison, the supply platform 30 will move a lesser amount than the dispensing platform 26 thereby always supplying a supply of powdered metal to the dispensing platform 26 which is less than the capacity of the dispensing platform 26. When the magnetic field is established to spring the spring 66, the spring 66 moves very rapidly to rotate the chute 34 very quickly in a counterclockwise direction. In so doing, the dispensing platform 26 is rotated in an arc about the pivot axis defined by the pins 38. The powder particles resting on the dispensing platform 26, because of their inertia, will remain in position as the platform 26 quickly moves rearwardly. In other words, the inertia of the particles on the platform 26 is greater than the friction between the particles and the platform 26 so that when the platform 26 rapidly moves rearwardly the particles will move forwardly relative to the dispensing platform 26. However, during the "off" portion of the cycle when the spring plate 66 is returning to its unsprung condition to rotate the chute in the clockwise direction, the rotation is much slower, therefore, the friction between the particles and the chute will maintain the particles in their new advance position on the chute 26. Under this continued action the particles will move up the slope of the dispensing platform 26 and fall over the lip 28 to form a curtain of falling particles. The dispensing platform 26 slopes upwardly so that when the assembly is shut down no particles will move up the slope 26 to be inadvertently droppd over the lip 28, i.e., to prevent spillage. Also, the ends of the dispensing lip 28 have side or end walls to prevent particles from moving off the ends of the dispensing platform 26.

Initially, it may be necessary to calibrate the assembly by establishing the proper gap between the core 86 and the spring plate 66. The gap between the spring plate 66 and the core 86 determines the amount or the effect of the magnetic field upon the spring plate 66 to move the spring plate 66. This gap may be adjusted by the adjustment nut and screw assembly 88 which longitudinally positions the core 86.

Since the supply platform 30 is supported for rocking movement about a pivot axis in unison with arcuate movement of a dispensing platform disposed therebelow and spaced a greater distance from the pivot axis, the assembly dispenses a precise and controlled amount of powder from the dispensing platform 26. It is important that the supply platform be located nearer the pivot than the point at which the vibration force is applied to obtain the greatest movement. The supply platform is located near or at the pivot to obtain a substantial movement arm to overcome the load or head of powder on the supply platform.

Although the invention has been described as using a 60 cycle frequency for the vibration, it must be appreciated that other frequecies may be utilized. In fact, the higher the frequency the more continuous would be the curtain of falling powder. Also, a higher frequency would result in smaller clusters or more finely divided particles would be separately dispensed.

It is important that the supply platform 30 supply less powder to the dispensing platform 26 than the capacity of the dispensing platform 26 to dispense so that powder never collects or piles up between the walls 44 and 46. This is important to the precise and controlled amount of powder over the lip 28. If a head of powder filled the space between the walls 44 and 46 it would have inertia and would necessarily be moved by the magnet. The head or depth would vary and therefore create a variable inertia because of the variable volume or mass of powder between the walls 44 and 46. Consequently, there would result erratic dispensing because the magnet produces a constant force but that force would be working against a changing or variable load created by the variable head, volume or mass of powder resting on the platform and extending upward between the walls 44 and 46. In other words, the constant force of the magnet working against the variable inertia resulting from the variable volume of powder would cause erratic or nonconstant dispensing.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A powder dispensing assembly (10) comprising; support structure (20), a dispensing platform (26) supported by said support structure (20) for receiving powder and having a distal lip (28) over which particles of powder move to define a falling curtain of powder particles, a supply platform (30) supported by said support structure (20) for receiving powder and supplying the powder to said dispensing platform (26), flow control means (34) for establishing a flow path of the powder from said supply platform (30) to said dispensing platform (26), said assembly characterized by drive means (36) for vibrating said dispensing platform (26) to move particles thereover and over said lip (28) and for moving said supply platform (30) in unison with said dispensing platform (26) to move powder from said supply platform (30) and through said flow control means (34) to said dispensing platform (26).

2. An assembly as set forth in claim 1 wherein said supply platform (30) is supported for rocking movement about a pivot axis (38).

3. An assembly as set forth in claim 2 wherein said dispensing platform (26) is supported for oscillation in an arc having a center on said pivot axis (38).

4. An assembly as set forth in claim 3 wherein said supply platform (30) is spaced more closely to said pivot axis (38) than said dispensing platform (26).

5. An assembly as set forth in claim 4 wherein said supply platform (30) is disposed above said dispensing platform (26) whereby powder particles fall from said supply platform (30) to said dispensing platform (26).

6. An assembly as set forth in claim 5 wherein said flow control means (34) includes an elongated chute having a funnel shape as viewed in cross section and opposite ends (40) with the wide upper portion (42) disposed about said supply platform (30) and the narrow lower portion (44, 46) defining an opening (48) over said dispensing platform (26).

7. An assembly as set forth in claim 6 wherein said ends (40) of said chute (34) are supported by said support structure (20) for oscillation about said pivot axis (38), said supply platform (30) being supported within said wide upper portion (42) of said chute (34) between said ends (40) thereof.

8. An assembly as set forth in claim 7 wherein said supply platform (30) is disposed immediately above said pivot axis (38).

9. An assembly as set forth in claim 8 wherein said supply platform (30) comprises an elongated flat plate having a longitudinal center line substantially vertically aligned with said pivot axis (38) when in a neutral horizontal position.

10. An assembly as set forth in claim 9 wherein said lower portion of said chute includes spaced front (44) and rear (46) walls and said dispensing platform (26) is integral with said rear wall (46) and extends forwardly beneath the lower extremity (48) of said front wall (44) to said lip (28).

11. An assembly as set forth in claim 10 wherein said dispensing platform (26) slopes upwardly from said rear wall (46) to said lip (28) in relationship to said front (44) and rear (46) walls.

12. An assembly as set forth in claim 11 wherein said support structure (20) includes a housing supporting said chute (34) for rotation about said pivot axis (38).

13. An assembly as set forth in claim 12 wherein said housing (20) is adapted to receive a supply slot (32) for supplying powder to said supply platform (30) so that the angle of repose of the powder from the supply slot (32) is less than the width of said supply platform (30) whereby powder remains upon the supply platform (30) when the supply platform remains horizontal.

14. An assembly as set forth in claim 13 wherein said drive means (36) includes a rod (58) extending into said housing (30) from the exterior thereof and connected to said rear wall (46) of said chute (34) adjacent the lower extremity thereof.

15. An assembly as set forth in claim 14 wherein said drive means (36) further includes a spring plate (66) extending between opposite ends of said housing (20) on the extremity of said housing (20), said rod (58) being connected to said spring plate (66), an electromagnet (80) for moving said spring plate (66) to move said rod (58) to rotate said chute (34) about said pivot axis (38), a U-shaped bracket (72) attached exteriorly of said housing (20) at the ends thereof and attached to the ends of said spring plate (66), said U-shaped bracket (72) supporting said electromagnet (80).

16. An assembly as set forth in claim 15 wherein said housing (20) is made of nonmagnetic material and said bracket (72) and said spring plate (66) are made of magnetic material, said electromagnet (80) being cyclically operable to establish a magnetic field for moving said spring plate (65) to move said dispensing platform (26) rearwardly so that said spring plate (66) returns to its unsprung condition between "on" cycles of said electromagnet (80).

* * * * *